United States Patent
Lai et al.

(10) Patent No.: US 10,425,647 B2
(45) Date of Patent: Sep. 24, 2019

(54) METHOD OF RESIDUE DIFFERENTIAL PULSE-CODE MODULATION FOR HEVC RANGE EXTENSION

(71) Applicant: HFI INNOVATION INC., Zhubei, Hsinchu County (TW)

(72) Inventors: Wang Lin Lai, San Jose, CA (US); Shan Liu, San Jose, CA (US)

(73) Assignee: HFI Innovation Inc., Zhubei (TW)

( * ) Notice: Subject to any disclaimer, the term of this patent is extended or adjusted under 35 U.S.C. 154(b) by 493 days.

(21) Appl. No.: 14/916,163

(22) PCT Filed: Oct. 8, 2014

(86) PCT No.: PCT/US2014/059604
§ 371 (c)(1),
(2) Date: Mar. 2, 2016

(87) PCT Pub. No.: WO2015/057438
PCT Pub. Date: Apr. 23, 2015

(65) Prior Publication Data
US 2016/0227221 A1 Aug. 4, 2016

Related U.S. Application Data

(60) Provisional application No. 61/890,365, filed on Oct. 14, 2013, provisional application No. 61/890,361, filed on Oct. 14, 2013.

(51) Int. Cl.
*H04N 19/159* (2014.01)
*H04N 19/107* (2014.01)
(Continued)

(52) U.S. Cl.
CPC ......... *H04N 19/159* (2014.11); *H04N 19/107* (2014.11); *H04N 19/11* (2014.11);
(Continued)

(58) Field of Classification Search
CPC ..... H04N 19/10; H04N 19/107; H04N 19/159
(Continued)

(56) References Cited

U.S. PATENT DOCUMENTS

2008/0192825 A1  8/2008  Lee et al.
2012/0224640 A1  9/2012  Sole Rojals et al.
(Continued)

FOREIGN PATENT DOCUMENTS

WO  WO 2015/049491 A1  4/2015

OTHER PUBLICATIONS

Tan, Y.H., et al.; "Non-RCE2:Unified lossless residue coding;" Joint Collaborative Team on Video Coding (JCT-VC) of ITU-T SG 16 WP 3 and ISO/IEC JTC 1/SC 29/WG 11; Jul.-Aug. 2013I pp. 1-7.
(Continued)

*Primary Examiner* — Jeffery A Williams
(74) *Attorney, Agent, or Firm* — Wolf, Greenfield & Sacks, P.C.

(57) ABSTRACT

A method of RDPCM (Residue Differential Pulse-Code Modulation) coding incorporating unified Intra and Inter RDPCM coding is disclosed. The same RDPCM encoding and decoding steps in the same processing order are applied to blocks coded in the Intra prediction mode and Inter prediction mode/IntraBC prediction mode (Intra-block copy mode). A method of extending Inter RDPCM coding to blocks coded in the IntraBC prediction mode. RDPCM processing in the vertical or horizontal direction is applied to IntraBC residue.

8 Claims, 5 Drawing Sheets

(51) Int. Cl.
| | |
|---|---|
| *H04N 19/10* | (2014.01) |
| *H04N 19/176* | (2014.01) |
| *H04N 19/70* | (2014.01) |
| *H04N 19/593* | (2014.01) |
| *H04N 19/11* | (2014.01) |
| *H04N 19/12* | (2014.01) |

(52) U.S. Cl.
CPC ........... *H04N 19/12* (2014.11); *H04N 19/176* (2014.11); *H04N 19/593* (2014.11); *H04N 19/70* (2014.11)

(58) Field of Classification Search
USPC .................................................... 375/240.13
See application file for complete search history.

(56) References Cited

U.S. PATENT DOCUMENTS

| | | | |
|---|---|---|---|
| 2013/0101025 A1 | 4/2013 | Van der Auwera et al. | |
| 2013/0107950 A1 | 5/2013 | Guo et al. | |
| 2013/0114716 A1 | 5/2013 | Gao et al. | |
| 2014/0286400 A1* | 9/2014 | Joshi ............... | H04N 19/70 375/240.03 |
| 2015/0063454 A1* | 3/2015 | Guo ................ | H04N 19/50 375/240.12 |

OTHER PUBLICATIONS

Flynn, D., et al.; "High Efficiency Video Coding (HEVC) Range Extensions text specification : Draft 4;" Joint Collaborative Team on Video Coding (JCT-VC) of ITU-T SG 16 WP 3 and ISO/IEC JTC 1/SC 29/WG 11; Apr. 2013; pp. 1-48.

Pang, C., et al.; "Non-RCE3:Intra Motion Compensation with 2-D MVs;" Joint Collaborative Team on Video Coding (JCT-VC) of ITU-T SG 16 WP 3 and ISO/IEC JTC 1/SC 29/WG 11; Jul.-Aug. 2013; pp. 1-14.

Sole, J., et al.; "RCE2: Results for combination of methods;" Joint Collaborative Team on Video Coding (JCT-VC) of ITU-T SG 16 WP 3 and ISO/IEC JTC 1/SC 29/WG 11; Jul.-Aug. 2013; pp. 1-3.

Joshi, R., et al.; "RCE2: Experimental Results for Test D.1;" Joint Collaborative Team on Video Coding (JCT-VC) of ITU-T SG 16 WP 3 and ISO/IEC JTC 1/SC 29/WG 11; Jul.-Aug. 2013; pp. 1-3.

Lee, S., et al.; "RCE2: Test 1 Residual DPCM for HEVC lossless coding;" Joint Collaborative Team on Video Coding (JCT-VC) of ITU-T SG 16 WP 3 and ISO/IEC JTC 1/SC 29/WG 11; Apr. 2013; pp. 1-8.

Naccari, M., et al.; "Inter-Prediction Residual DPCM;" Joint Collaborative Team on Video Coding (JCT-VC) of ITU-T SG 16 WP 3 and ISO/IEC JTC 1/SC 29/WG 11; Apr. 2013; pp. 1-12.

Sole, J., et al.; "Test B.1: Residue rotation and significance map context;" Joint Collaborative Team on Video Coding (JCT-VC) of ITU-T SG 16 WP 3 and ISO/IEC JTC 1/SC 29/WG 11; Jul.-Aug. 2013; pp. 1-7.

Peng, X., et al.; "Non-RCE2: Transform skip on large TUs;" oint Collaborative Team on Video Coding (JCT-VC) of ITU-T SG 16 WP 3 and ISO/IEC JTC 1/SC 29/WG 11; Jul.-Aug. 2013; pp. 1-6.

International Search Report dated Jan. 13, 2015, issued in application No. PCT/US2014/059604.

* cited by examiner

METHOD OF RESIDUE DIFFERENTIAL PULSE-CODE MODULATION FOR HEVC RANGE EXTENSION

CROSS REFERENCE TO RELATED APPLICATIONS

The present invention is a national phase application of PCT/US2014/059604, filed Oct. 8, 2014, which claims priority to U.S. Provisional Patent Application, Ser. No. 61/890,365, filed on Oct. 14, 2013, entitled "Unification and Harmonization of Residue Differential Pulse-Code Modulation (RDPCM) with Transform-Skip and Residue Rotation for HEVC Range Extension" and U.S. Provisional Patent Application, Ser. No. 61/890,361, filed on Oct. 14, 2013, entitled "Modifications to the Text Specification of HEVC Range Extension". The U.S. Provisional Patent Applications are hereby incorporated by reference in their entireties.

FIELD OF THE INVENTION

The present invention relates to RDPCM (Residue Differential Pulse-Code Modulation) coding for High Efficiency Video Coding (HEVC) Range Extension. In particular, the present invention relates to Intra RDPCM coding, Intra-block copy (IntraBC) and Inter RDPCM coding modes for HEVC Range Extension or similar applications.

BACKGROUND AND RELATED ART

In the current development of range extension (RExt) for High Efficiency Video Coding (HEVC) standard, several tools have been adopted due to their improvements in coding efficiency for screen contents. In particular, the residue differential pulse-code modulation (RDPCM) and residue rotation (RR) tools are utilized for video compression. These tools may be applied to lossless transform-quantization bypass blocks or lossy transform-skip (TS) blocks. The "transform skip" coding mode is a coding mode where the transform process is skipped so that the residual is directly quantized and entropy coded. While transform is skipped for a block, other processing for a transform-coded block is still applied to the block. Accordingly, scaling is still applied to the TS block. The two-dimensional block residue needs to be converted into a one-dimensional signal. Accordingly, scanning (e.g., vertical or horizontal scan) is applied to the residue block. The scanning may also be applied before or after scaling, or after quantization. At the decoder side, the inverse TS (inv-TS) will be applied to a coded block. The inv-TS includes inverse scaling. It is noted that the coding unit (CU) is a basic unit that the coding process is applied. The residue is formed for each CU, which is further divided into blocks named transform units (TUs) for transform process used in conventional coding process (i.e., non TS). Furthermore, it is also possible to skip both the transform and the quantization processes to enable lossless coding of CUs. In the case of lossless coding, loop filtering is also turned off.

For Intra blocks, Intra prediction is performed using prediction based on reconstructed pixels from neighboring blocks. Intra prediction may select an Intra Mode from a set of Intra Modes, which include a vertical mode, horizontal mode and various angular prediction modes. For Intra blocks other than the blocks coded by Intra-block copy (IntraBC), the direction of RDPCM processing depends on the Intra Mode of the underlying block. RDPCM is only applied to Intra coded blocks using the horizon and vertical modes along the respective horizontal and vertical directions. For Inter and IntraBC blocks, the encoder decides whether to use RDPCM by signaling a flag. The encoder also decides the RDPCM direction by signaling another flag. While RDPCM for both Intra residue (other than IntraBC) and Inter residue uses horizontal DPCM or vertical DPCM, there are some differences between Intra RDPCM processing and Inter RDPCM processing. The selection of prediction direction (i.e., horizontal or vertical) for Intra RDPCM processing is determined implicitly based on the Intra Mode for the block. On the other hand, whether to use RDPCM and the prediction direction are determined at the encoder side and the decision is signaled explicitly. In this disclosure, RDPCM processing refers to the DPCM (Differential Pulse-Code Modulation) procedure applied to a residue signal or processed residue signal (e.g., a residue signal processed by TS). RDPCM coding refers to coding method that includes RDPCM processing.

FIG. 1 illustrates an exemplary of lossless vertical RDPCM processing, where the residue samples of an Intra coded block are subtracted with a vertical neighboring sample except for the samples in the top row to further reduce the redundancy. For a block with N columns and M rows of samples, let $r_{i,j}$, $0 \leq i \leq M-1, 0 \leq j \leq N-1$ be the prediction residue after Intra prediction. Assume that the transform and quantization are skipped. Lossless vertical RDPCM processing is applied to the residual samples as follows:

$$\tilde{r}_{i,j} = \begin{cases} r_{i,j}, & i = 0, 0 \leq j \leq (N-1) \\ r_{i,j} - r_{(i-1),j}, & 1 \leq i \leq (M-1), 0 \leq j \leq (N-1) \end{cases} \quad (1)$$

For RDPCM coding, the DPCM processed residue (i.e., $\tilde{r}_{i,j}$) is further coded instead of the residue signal (i.e., $r_{i,j}$) itself. For lossless horizontal RDPCM processing, the subtractions are performed between a current sample and a left neighboring sample except for samples in the first column. As for the lossy case, the residue differences are subjected to quantization. Equation (2) illustrates an example of lossy vertical RDPCM processing being applied to the residual samples:

$$\tilde{r}_{i,j} = \begin{cases} r_{i,j}, & i = 0, 0 \leq j \leq (N-1) \\ r_{i,j} - Q(r_{(i-1),j}), & 1 \leq i \leq (M-1), 0 \leq j \leq (N-1) \end{cases} \quad (2)$$

where, $Q(r_{(i-1),j})$ denotes a quantized version of residue sample, $r_{(i-1),j}$. For Inter RDPCM processing, residual DPCM is applied to Inter coded blocks. Equation (1) is also applicable to Inter RDPCM processing, where the residue signal corresponds to the Inter prediction residue instead of the Intra prediction residue for the case of Intra RDPCM. For lossless horizontal RDPCM processing, the subtractions are performed between a current sample and a left neighboring sample except for samples in the first column. As for the lossy case, the residue differences are subjected to quantization.

As for residue rotation (RR), the residue block is rotated 180-degree so that it will be likely to have the likely larger DPCM prediction residue in the bottom-right corner rotated to the top-left corner. The rotated DPCM prediction residue will better fit for the entropy coder that was originally designed for transform coefficients. FIG. 2 illustrates an example of the RR processing, where the DPCM prediction residue has some non-zero (NZ) samples in the bottom-right corner. The NZ samples are rotated to the top-left corner by the RR processing.

According to the existing RExt practice, the encoding and decoding processes for the residue vary depending on Inter/Intra and lossy/lossless selections when both RDPCM and RR processing are invoked. Following is the highlight of the corresponding encoding and decoding processes for the residue signal. The notation "inv-TS" denotes the inverse transform-skip, and "inv-RDPCM" denotes the inverse RDPCM.

Note that RDPCM is invoked only under transform-quantization (transquant) bypass, or under transform-skip. Also note that Residue Rotation (RR) itself has a separate control flag, which can be enabled independent from RDPCM. In other words, when RDPCM is used, RR can be on or off; and when RR is used, RDPCM can be on or off.

Encoding Process
Intra (excluding Intra-block-copy) encoding:
If CU is coded in transquant bypass: RDPCM→RR
If TU is coded in transform-skip: RDPCM→TS→RR→quantization
Inter and Intra-block-copy encoding:
If CU is coded in transquant bypass: RDPCM→RR
If TU is coded in transform-skip: TS→RR→RDPCM→quantization
Decoding Process
Intra (excluding Intra-block-copy) decoding:
If CU is coded in transquant bypass: RR→inv-RDPCM
If TU is coded in transform-skip: De-quantization→RR→inv-TS→inv-RDPCM
Inter and Intra-block-copy decoding:
If CU is coded in transquant bypass: RR→inv-RDPCM
If TU is coded in transform-skip: De-quantization→inv-RDPCM→RR→inv-TS In the above encoding and decoding process, "transquant bypass" refers to a specific lossless coding mode, where a lossless coding means bypassing both the DCT transforms and bypassing quantization is applied. The two processes as highlighted in bold, such as TS→RR and RR→inv-TS, indicates that they are bundled together. For software based implementation, RR can be performed within the TS and inv-TS functions. The decoding process inconsistency increases implementation difficulty. Therefore, it is desirable to harmonize and unify the decoding process for the combinations of RDPCM and RR.

In the existing RExt of HEVC, the Inter-RDPCM is applied only to Inter blocks. The IntraBC residue is formed between a current block and a reference block in the same picture is regarded as an Intra block. Therefore, Inter-RDPCM is not applied to blocks processed by IntraBC prediction mode. On the other hand, the blocks coded in IntraBC prediction mode doesn't use horizontal or vertical Intra Mode, therefore these blocks are not processed by Intra RDPCM either. It is desirable to develop coding scheme to improve performance for blocks processed by IntraBC prediction mode.

BRIEF SUMMARY OF THE INVENTION

A method of RDPCM (Residue Differential Pulse-Code Modulation) coding incorporating unified Intra and Inter RDPCM coding according to the present invention is disclosed. A prediction mode for the current block is determined, where the prediction mode is selected from a first group comprising an Intra prediction mode and at least one of an Inter prediction mode and an IntraBC mode (Intra-block copy mode). A coding mode is also determined for the current block, where the coding mode is selected from a second group comprising a transquant bypass mode (transform-quantization bypass mode) and a TS (transform-skip) coding mode. One embodiment of the present invention unifies the RDPCM coding process between the Intra mode and Inter/IntraBC prediction mode. Accordingly, when the current block is coded using the Intra prediction mode, first RDPCM encoding or decoding is applied to the current block. When the current block is coded using the Inter prediction mode or the IntraBC prediction mode, second RDPCM encoding or decoding is applied to the current block. The first RDPCM encoding and the second RDPCM encoding use same encoding steps applied in the same encoding processing order. Also, the first RDPCM decoding and the second RDPCM decoding use same decoding steps applied in the same decoding processing order.

For the transquant bypass mode, the same encoding steps may comprise RR (residue rotation) processing and RDPCM processing, and the same decoding steps may comprise the RR processing and inverse RDPCM processing. The encoding processing order may correspond to the RR processing followed by the RDPCM processing, and the decoding processing order may correspond to the inverse RDPCM processing followed by the RR processing.

For the TS coding mode, the same encoding steps may comprise TS processing, RR (residue rotation) processing, RDPCM processing and quantization processing, and the same decoding steps may comprise de-quantization processing, inverse RDPCM processing, the RR processing and inverse TS processing. The encoding processing order may correspond to the RDPCM processing followed by the TS processing and the RR processing in order, and the decoding processing order corresponds to the RR processing followed by the inverse TS processing and the inverse RDPCM processing in order. In another embodiment, the encoding processing order may correspond to the TS processing followed by the RDPCM processing and the RR processing in order, and the decoding processing order may correspond to the RR processing followed by the inverse RDPCM processing and the inverse TS processing in order.

In another embodiment, Inter RDPCM coding is extended to blocks coded in the IntraBC prediction mode. In other words, the IntraBC residue is treated as if it were Inter prediction residue and Inter RDPCM processing with vertical or horizontal prediction direction is applied to IntraBC residue or processed IntraBC residue.

DETAILED DESCRIPTION OF THE INVENTION

Figures 1, 2:
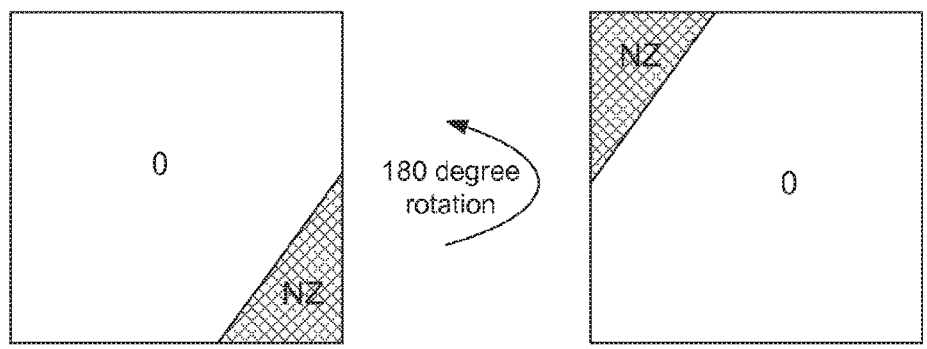
FIG. 1 illustrates an example of RDPCM (Residue Differential Pulse-Code Modulation) processing in the vertical direction.
FIG. 2 illustrates an example of the residue rotation processing that rotates the likely large residue at the lower right corner to the upper left corner.

In order to reduce the complexity due to processing dependency on Inter/Intra and lossy/lossless modes for residue differential pulse-code modulation (RDPCM) coding, embodiments according to the present invention use unified RDPCM coding process for Inter/Intra and lossy/lossless modes.

First Embodiment—Modifying Inter/IntraBC Lossy Process to Align with Other Cases Based on the decoding process described earlier, it is noted that the Inter/IntraBC lossy (i.e., transform-skip mode) process is a special case, where inv-RDPCM is performed before RR and inv-TS. Accordingly, the first embodiment is to modify only this case to be unified with other cases, as the following:
Unified RDPCM coding, Method 1:
  Encode: If TU is coded using transform-skip: RDPCM→TS→RR→quantization
  Decode: If TU is coded using transform-skip: De-quantization→RR→inv-TS→inv-RDPCM
  Note that Residue Rotation (RR) itself has a separate control flag, which is not bundled with RDPCM.

Accordingly, inv-RDPCM will always be the last step in the decoding process of the residue signal regardless of Inter/Intra or lossy/lossless. This will simplify the decoding process. As for the encoder, RDPCM will always be performed first, followed by TS (if lossy case), which applies left-shift (i.e., scaling) to the residue and applies rotation and quantization afterward.

Second Embodiment—Harmonizing all Cases Towards Inter/IntraBC Lossy Process

An alternative approach to the first Embodiment is to harmonize all other cases with the Inter/IntraBC lossy process. In other words, in the residue decoding process, RR and inv-TS are moved to after inv-RDPCM. In the encoder side, TS and RR are moved to before RDPCM. The corresponding processes are shown as follows:
Unified RDPCM coding, Method 2:
  Encoding Process
    If CU is coded using transquant bypass: RR→RDPCM
    If TU is coded using transform-skip: TS→RR→RDPCM→quantization
  Decoding Process
    If CU is coded using transquant bypass: inv-RDPCM→RR
    If TU is coded using transform-skip: De-quantization→inv-RDPCM→RR→inv-TS Note that Residue Rotation (RR) itself has a separate control flag, which is not bundled with RDPCM.

In the second Embodiment of unified RDPCM processing, since TS (left-shift) operation is performed first at the encoder side for the residue block, the subsequent row-by-row/column-by-column RDPCM and quantization will operate on a higher precision domain. Therefore, the second Embodiment may lead to improved coding efficiency in terms of BD-rate which is a well-known performance measure for video coding.

Third Embodiment—Decoding Process with RR→inv-RDPCM→inv-TS (Encoder: TS→RDPCM→RR)

While placing TS before RDPCM at the encoder side may provide better coding efficiency, the third Embodiment further considers the impact of RR with RDPCM especially on Intra blocks. The effectiveness of Intra RDPCM comes from the exploiting redundancy in the residue along the Intra prediction direction. For example, the Intra RDPCM vertical mode exploits the vertical redundancy by subtracting residues row-by-row. The bottom row is likely to have larger largest residue. If RR is performed before RDPCM at the encoder side, the likely largest residue at the bottom row will be rotated to the top row. This could not benefit from RDPCM. Thus, in the third Embodiment, the bundling of TS→RR and RR→inv-TS is separated, which leads to encoding/decoding process with RDPCM/inv-RDPCM in between TS→RR and RR→inv-TS respectively. The corresponding processes are as shown as follows:
Unified RDPCM coding, Method 3:
  Encoding Process
    If CU is coded using transquant bypass: RDPCM→RR
    If TU is coded using transform-skip: TS→RDPCM→RR→quantization
  Decoding Process
    If CU is coded using transquant bypass: RR→inv-RDPCM
    If TU is coded using transform-skip: De-quantization→RR→inv-RDPCM→inv-TS Note that Residue Rotation (RR) itself has a separate control flag, which is not bundled with RDPCM.

In order to improve the performance for blocks coded by the IntraBC prediction mode, another aspect of the present invention extends the Inter-RDPCM to blocks coded by the IntraBC prediction mode.

Fourth Embodiment—Extending Inter-RDPCM to IntraBC Blocks

In order to extend Inter-RDPCM coding process to IntraBC predicted blocks for the Range Extension of HEVC, parsing of syntax RDPCM On/Off flags and RDPCM direction flags need to be included for IntraBC blocks. Furthermore, the RDPCM processing needs to be invoked. An example of syntax modification to support the fourth Embodiment is shown in Table 1.

TABLE 1

| residual_coding( x0, y0, log2TrafoSize, cIdx ) { | Descrip. | Note |
|---|---|---|
| if( transform_skip_enabled_flag && !cu_transquant_bypass_flag && ( log2TrafoSize <= Log2MaxTransformSkipSize ) ) transform_skip_flag[ x0 ][ y0 ][ cIdx ] if( ( ( CuPredMode[x0][y0] == MODE_INTER && esidual_dpcm_inter_enabled_flag ) ||*( CuPredMode[ x0 ][ y0 ] == MODE_INTRA && intra_bc_flag[ x0 ][ y0 ] &&residual_dpcm_intra_enabled_flag ) )* && ( transform_skip_flag[ x0 ][ y0 ][ cIdx ] || cu_transquant_bypass_flag ) ) { | ae(v) | (1) |

TABLE 1-continued

```
residual_coding( x0, y0, log2TrafoSize, cIdx ) {                                    Descrip.  Note
    inter_rdpcm_flag[ x0 ][ y0 ][ cIdx ]                                            ae(v)
    if( inter_rdpcm_flag[ x0 ][ y0 ][ cIdx ] )
        inter_rpdcm_dir_flag[ x0 ][ y0 ][ cIdx ]                                    ae(v)
    }
        ...
    }
    if( cu_transquant_bypass_flag
        || ( CuPredMode[ xC ][ yC ] = = MODE_INTRA &&
            residual_dpcm_intra_enabled_flag && transform_skip_flag[x0][y0][cIdx] &&
            ( predModeIntra = = 10 || predModeIntra = = 26 ) )
        || ( CuPredMode[ xC ][ yC ] = = MODE_INTER &&
            residual_dpcm_inter_enabled_flag && inter_rdpcm_flag[ x0 ][ y0 ][ cIdx ] )
        ||( CuPredMode[ xC ][ yC ] = = MODE_INTRA &&                                          (2)
            intra_bc_flag[ x0 ][ y0 ] &&intra_rdpcm_flag[ x0 ][ y0 ][ cIdx ]) )
        signHidden = 0
    else
        signHidden = ( lastSigScanPos − firstSigScanPos > 3 )
        ...                                                                         ae(v)
    ...
    ...
```

As shown in Note (1) of Table 1, additional texts (in Bold Italic) have been added to the syntax to extend Inter RDPCM to blocks coded by IntaBC mode. In particular, the new text, "(CuPredMode[x0][y0]==MODE_INTRA && intra_bc_flag[x0][y0] && residual_dpcm_intra_enabled_flag)" is related to extending the Inter RDPCM coding to IntraBC predicted mode, where MODE_INTRA having a value of 1 indicates the block is coded in Intra prediction mode, intra_bc_flag[x0][y0] having a value of 1 indicates the block is IntaBC coded, and residual_dpcm_intra_enabled_flag having a value of 1 indicates that RDPCM is enabled for Intra prediction mode. As shown in Note (2) of Table 1, additional texts (in Bold Italic) have been added to the syntax to extend Inter RDPCM coding to blocks coded by IntaBC mode. In particular, the new text, "(CuPredMode[xC][yC]==MODE_INTRA && intra_bc_flag[x0][y0] && inter_rdpcm_flag[x0][y0][cIdx])" is related to extending the Inter-RDPCM coding to IntraBC prediction mode, where inter_rdpcm_flag[x0][y0][cIdx] having a value of 1 indicates that RDPCM is enabled for Intra prediction mode.

The practice of extending Inter-RDPCM coding to IntraBC blocks according to the present invention can be applied to the luminance residual blocks as well as chrominance residual blocks.

Fifth Embodiment—Simplifying CU-Level Transquant Bypass Signalling with an PPS Flag In the current HEVC range extension specification, an encoding parameter from the configuration file is used for lossless coding conditions. When the lossless conditions are asserted, all CUs in the associated picture/slice will be coded using the transquant bypass mode. At the decoder side, a flag, cu_transquant_bypass_flag is parsed for each CU even though the coding conditions already force every CU to be coded using the transquant bypass mode.

An embodiment of the present invention overcomes the issue by avoiding the redundant parsing process using a picture level flag. When such lossless coding conditions are asserted, the following changes are made to the CU-level parsing of cu_transquant_bypass_flag according to an embodiment of the present invention as shown in Table 2. In addition, a PPS (picture parameter set) flag (i.e., force_cu_transquant_bypass_flag) is used to indicate that all CUs in the associated picture are coded using the transquant bypass mode as shown in Table 3.

TABLE 2

| coding_unit( x0, y0, log2CbSize ) { | Descriptor |
|---|---|
| if( transquant_bypass_enabled_flag && !force_cu_transquant_bypass_flag ) | |
|     cu_transquant_bypass_flag | ae(v) |
|     ... | |
| } | |

TABLE 3

| pic_parameter_set_rbsp( ) { | Descriptor |
|---|---|
| ... | u(1) |
| transquant_bypass_enabled_flag | u(1) |
| if(transquant_bypass_enabled_flag) | |
|     force_cu_transquant_bypass_flag | u(1) |
| ... | |
| } | |

As shown in Table 2, the flag, cu_transquant_bypass_flag is parsed only when both the transquant bypass mode is enabled (i.e., transquant_bypass_enabled_flag==1) and the CU is not forced to use the transquant bypass mode (i.e., force_cu_transquant_bypass_flag==0). Accordingly, the redundant syntax element parsing for cu_transquant_bypass_flag can be avoided.

As shown in Table 3, a flag (i.e., force_cu_transquant_bypass_flag) is present in the PPS to indicate whether all CUs in the associated picture are coded using the transquant bypass mode. This flag is present when the transquant bypass mode is enabled as indicated by transquant_bypass_enabled_flag. When force_cu_transquant_bypass_flag equals to 1, cu_transquant_bypass_flag is not present and cu_transquant_bypass_flag is inferred to be 1. When force_cu_transquant_bypass_flag equals to 0, cu_transquant_bypass_flag is present. If force_cu_transquant_bypass_flag is not present, it is inferred to be equal to 0.

The performance of a system incorporating the fourth Embodiment of the present invention is compared to that of a conventional system. Table 4 illustrates the performance comparison conducted under the test condition specified in document JCTVC-N1123 (Ankur Saxena, et al., "*HEVC Range Extensions Core Experiment* 3 (*RCE*3): *Intra Prediction techniques*", Joint Collaborative Team on Video Coding (JCT-VC) of ITU-T SG 16 WP 3 and ISO/IEC JTC 1/SC 29/WG 11, 14th Meeting: Vienna, Austria, 25 Jul.-2 Aug. 2013, Document: JCTVC-N1123). In the performance comparison, the software base is HM-12.0 (HEVC Test Model, version 12.0). The reference is with Inter-RDPCM extended to IntraBC blocks as reference. The test data disallows Inter-RDPCM to IntraBC blocks. The comparisons are performed based on various test materials as listed in column 1. The improvement in bitrate according to an embodiment of the present invention over the conventional approach is shown for various system configurations including All Intra HE (High Efficiency) Main-tier, All Intra HE High-tier, and All Intra HE Super High-tier. As shown in Table 4, when Inter-RDPCM is disallowed for IntraBC blocks, the bitrate increase is more noticeable for screen content test materials (i.e., SC(444) GBR and SC(444) YUV), where the increase is up to 5.2%. The encoding and decoding times are about the same.

TABLE 4

|  | All Intra HE Main-tier | | | All Intra HE High-tier | | | All Intra HE Super-High-tier | | |
| --- | --- | --- | --- | --- | --- | --- | --- | --- | --- |
|  | Y | U | V | Y | U | V | Y | U | V |
| Class F | 0.5% | 0.3% | 0.3% | 0.4% | 0.3% | 0.1% | 0.3% | 0.3% | 0.3% |
| Class B | 0.0% | 0.0% | 0.0% | 0.0% | 0.0% | 0.0% | 0.0% | 0.0% | 0.0% |
| SC RGB 444 | 1.1% | 1.1% | 1.1% | 1.3% | 1.3% | 0.2% | 1.3% | 1.2% | 1.2% |
| Animation RGB 444 | 0.0% | 0.0% | 0.0% | 0.0% | 0.0% | 0.0% | 0.0% | 0.0% | 0.0% |
| SC YUV 444 | 0.9% | 0.8% | 0.8% | 0.9% | 0.8% | 0.3% | 0.9% | 0.8% | 0.8% |
| Animation YUV 444 | 0.0% | 0.1% | 0.0% | 0.0% | 0.1% | 0.0% | 0.0% | 0.0% | 0.0% |
| RangeExt | 0.0% | 0.0% | 0.0% | 0.0% | 0.0% | 0.0% | 0.0% | 0.0% | 0.0% |
| SC(444) GBR Optional | 3.9% | 4.1% | 4.2% | 4.7% | 5.1% | 0.1% | 5.1% | 5.2% | 5.1% |
| SC(444) YUV Optional | 2.9% | 2.7% | 2.8% | 3.2% | 3.2% | 0.2% | 3.5% | 3.7% | 3.5% |
| Enc Time [%] |  | 99% |  |  | 99% |  |  | 99% |  |
| Dec Time [%] |  | 100% |  |  | 100% |  |  | 100% |  |

The performance of systems incorporating two embodiments of the present invention for unified Intra and Inter coding is compared to each other. The first system corresponds to the first embodiment and the second system corresponds to the third embodiment. Tables 5-7 illustrate the performance comparison conducted under the test condition specified in document JCTVC-N1123. The first embodiment is used as an anchor system for performance comparison and a negative value in the table implies the second system performs better than the first system. Table 5 illustrates the results for various system configurations including All Intra HE (High Efficiency) Main-tier, All Intra HE High-tier, and All Intra HE Super High-tier. The third embodiment shows slight improvement in bitrate over the first embodiment. Table 6 illustrates the results for Random Access HE Main-tier and Random Access HE High-tier. The third embodiment shows slight improvement in bitrate over the first embodiment. Table 7 illustrates the results for Low-delay B HE Main-tier and Low-delay B HE High-tier. The third embodiment shows slight improvement in bitrate over the first embodiment. The encoding and decoding times are about the same for all cases.

TABLE 5

|  | All Intra HE Main-tier | | | All Intra HE High-tier | | | All Intra HE Super-High-tier | | |
| --- | --- | --- | --- | --- | --- | --- | --- | --- | --- |
|  | Y | U | V | Y | U | V | Y | U | V |
| Class F | 0.0% | 0.0% | −0.1% | 0.0% | 0.0% | −0.1% | 0.0% | 0.0% | −0.1% |
| Class B | 0.0% | 0.0% | 0.0% | 0.0% | 0.0% | 0.0% | 0.0% | 0.0% | 0.0% |
| SC RGB 444 | 0.0% | 0.0% | 0.0% | 0.0% | −0.1% | −0.1% | −0.2% | −0.2% | −0.2% |
| Animation RGB 444 | 0.0% | 0.0% | 0.0% | 0.0% | 0.0% | 0.0% | 0.0% | 0.0% | 0.0% |
| SC YUV 444 | −0.1% | 0.0% | 0.0% | −0.1% | −0.1% | −0.1% | −0.2% | −0.2% | −0.1% |
| Animation YUV 444 | 0.0% | 0.0% | 0.0% | 0.0% | 0.0% | 0.0% | 0.0% | 0.0% | 0.0% |
| RangeExt | 0.0% | 0.0% | 0.0% | 0.0% | 0.0% | 0.0% | 0.0% | 0.0% | 0.0% |
| SC(444) GBR Optional | −0.1% | −0.1% | −0.1% | −0.2% | −0.3% | −0.3% | −0.7% | −0.5% | −0.5% |
| SC(444) YUV Optional | 0.0% | 0.0% | −0.2% | −0.1% | 0.0% | −0.3% | −0.3% | −0.3% | −0.4% |
| Enc Time [%] |  | 99% |  |  | 99% |  |  | 99% |  |
| Dec Time [%] |  | 98% |  |  | 99% |  |  | 98% |  |

TABLE 6

| | Random Access HE Main-tier | | | Random Access HE High-tier | | |
|---|---|---|---|---|---|---|
| | Y | U | V | Y | U | V |
| Class F | 0.0% | 0.0% | −0.1% | 0.0% | 0.0% | −0.1% |
| Class B | 0.0% | 0.0% | 0.0% | 0.0% | 0.0% | 0.0% |
| SC RGB 444 | −0.2% | −0.3% | 0.0% | −0.2% | −0.3% | −0.2% |
| Animation RGB 444 | 0.0% | 0.0% | 0.0% | 0.0% | 0.0% | 0.0% |
| SC YUV 444 | −0.4% | −0.3% | 0.0% | −0.4% | −0.3% | −0.3% |
| Animation YUV 444 | 0.0% | 0.0% | 0.0% | 0.0% | 0.0% | 0.0% |
| RangeExt | 0.0% | 0.0% | 0.0% | 0.0% | 0.0% | 0.0% |
| SC(444) GBR Optional | −0.4% | −0.4% | −0.1% | −0.4% | −0.5% | −0.4% |
| SC(444) YUV Optional | 0.0% | −0.3% | −0.2% | −0.1% | −0.4% | −0.3% |
| Enc Time [%] | | 100% | | | 100% | |
| Dec Time [%] | | 100% | | | 100% | |

TABLE 7

| | Low-delay B HE Main-tier | | | Low-delay B HE High-tier | | |
|---|---|---|---|---|---|---|
| | Y | U | V | Y | U | V |
| Class F | 0.1% | 0.3% | 0.2% | 0.1% | 0.2% | 0.1% |
| Class B | 0.0% | 0.2% | −0.2% | 0.0% | 0.1% | 0.0% |
| SC RGB 444 | 0.1% | 0.0% | 0.0% | −0.1% | 0.0% | −0.1% |
| Animation RGB 444 | 0.0% | 0.0% | 0.0% | 0.0% | 0.0% | 0.0% |
| SC YUV 444 | −0.4% | −0.6% | −0.5% | −0.6% | −0.8% | −0.6% |
| Animation YUV 444 | 0.0% | 0.1% | 0.0% | 0.0% | 0.0% | −0.1% |
| RangeExt | 0.0% | 0.0% | 0.0% | 0.0% | 0.0% | 0.0% |
| SC(444) GBR Optional | 1.3% | 1.3% | 1.2% | 0.6% | 0.7% | 0.6% |
| SC(444) YUV Optional | 1.5% | 1.7% | 1.5% | 2.1% | 2.2% | 2.2% |
| Enc Time [%] | | 100% | | | 100% | |
| Dec Time [%] | | 100% | | | 100% | |

The performance of systems incorporating two embodiments of the present invention for unified Intra and Inter coding is compared to each other. The first system corresponds to the first embodiment without residue rotation and the second system corresponds to the third embodiment without residue rotation. Tables 8-10 illustrate the performance comparison conducted under the test condition specified in document JCTVC-N1123. The first embodiment without residue rotation is used as an anchor system for performance comparison. Table 8 illustrates the results for various system configurations including All Intra HE (High Efficiency) Main-tier, All Intra HE High-tier, and All Intra HE Super High-tier. The third embodiment without residue rotation shows slight improvement in bitrate over the first embodiment without residue rotation. Table 9 illustrates the results for Random Access HE Main-tier and Random Access HE High-tier. The third embodiment without residue rotation shows slight improvement in bitrate over the first embodiment without residue rotation. Table 10 illustrates the results for Low-delay B HE Main-tier and Low-delay B HE High-tier. The third embodiment without residue rotation shows slight improvement in bitrate over the first embodiment without residue rotation. The encoding and decoding times are about the same for all cases.

TABLE 8

| | All Intra HE Main-tier | | | All Intra HE High-tier | | | All Intra HE Super-High-tier | | |
|---|---|---|---|---|---|---|---|---|---|
| | Y | U | V | Y | U | V | Y | U | V |
| Class F | 0.0% | 0.0% | 0.0% | 0.0% | 0.0% | −0.1% | 0.0% | 0.0% | −0.1% |
| Class B | 0.0% | 0.0% | 0.0% | 0.0% | 0.0% | 0.0% | 0.0% | 0.0% | 0.0% |
| SC RGB 444 | 0.0% | 0.0% | 0.0% | −0.1% | −0.1% | −0.1% | −0.2% | −0.2% | −0.2% |
| Animation RGB 444 | 0.0% | 0.0% | 0.0% | 0.0% | 0.0% | 0.0% | 0.0% | 0.0% | 0.0% |
| SC YUV 444 | −0.1% | 0.0% | 0.0% | −0.1% | −0.1% | −0.1% | −0.2% | −0.2% | −0.1% |
| Animation YUV 444 | 0.0% | 0.0% | 0.0% | 0.0% | 0.0% | 0.0% | 0.0% | 0.0% | 0.0% |
| RangeExt | 0.0% | 0.0% | 0.0% | 0.0% | 0.0% | 0.0% | 0.0% | 0.0% | 0.0% |
| SC(444) GBR Optional | −0.1% | −0.2% | −0.2% | −0.3% | −0.3% | −0.3% | −0.7% | −0.5% | −0.5% |
| SC(444) YUV Optional | −0.1% | 0.0% | −0.1% | −0.1% | 0.0% | −0.2% | −0.3% | −0.3% | −0.3% |
| Enc Time [%] | | 101% | | | 101% | | | 101% | |
| Dec Time [%] | | 101% | | | 101% | | | 100% | |

TABLE 9

| | Random Access HE Main-tier | | | Random Access HE High-tier | | |
|---|---|---|---|---|---|---|
| | Y | U | V | Y | U | V |
| Class F | 0.0% | −0.1% | −0.1% | 0.0% | 0.0% | 0.0% |
| Class B | 0.0% | 0.1% | 0.1% | 0.0% | 0.1% | 0.0% |
| SC RGB 444 | −0.1% | −0.1% | −0.1% | 0.0% | −0.1% | −0.1% |
| Animation RGB 444 | 0.0% | 0.0% | 0.0% | 0.0% | 0.0% | 0.0% |
| SC YUV 444 | −0.1% | 0.0% | 0.0% | −0.1% | 0.0% | 0.0% |
| Animation YUV 444 | 0.0% | −0.1% | 0.0% | 0.0% | −0.1% | 0.0% |
| RangeExt | 0.0% | 0.0% | 0.0% | 0.0% | 0.0% | 0.0% |
| SC(444) GBR Optional | −0.3% | −0.3% | −0.2% | −0.4% | −0.4% | −0.3% |
| SC(444) YUV Optional | 0.0% | 0.0% | 0.0% | −0.1% | −0.2% | −0.2% |
| Enc Time [%] | | 102% | | | 102% | |
| Dec Time [%] | | 105% | | | 105% | |

TABLE 10

| | Low-delay B HE Main-tier | | | Low-delay B HE High-tier | | |
|---|---|---|---|---|---|---|
| | Y | U | V | Y | U | V |
| Class F | 0.1% | 0.0% | −0.1% | 0.0% | 0.1% | −0.2% |
| Class B | 0.0% | 0.0% | 0.2% | 0.0% | 0.0% | 0.0% |
| SC RGB 444 | 0.2% | 0.1% | 0.0% | 0.0% | −0.1% | −0.1% |

TABLE 10-continued

|  | Low-delay B HE Main-tier | | | Low-delay B HE High-tier | | |
| --- | --- | --- | --- | --- | --- | --- |
|  | Y | U | V | Y | U | V |
| Animation RGB 444 | 0.0% | −0.1% | −0.1% | 0.0% | 0.0% | 0.0% |
| SC YUV 444 | −0.1% | −0.2% | −0.1% | 0.2% | 0.1% | 0.1% |
| Animation YUV 444 | 0.0% | 0.1% | 0.0% | 0.0% | 0.1% | 0.0% |

Figure 3:
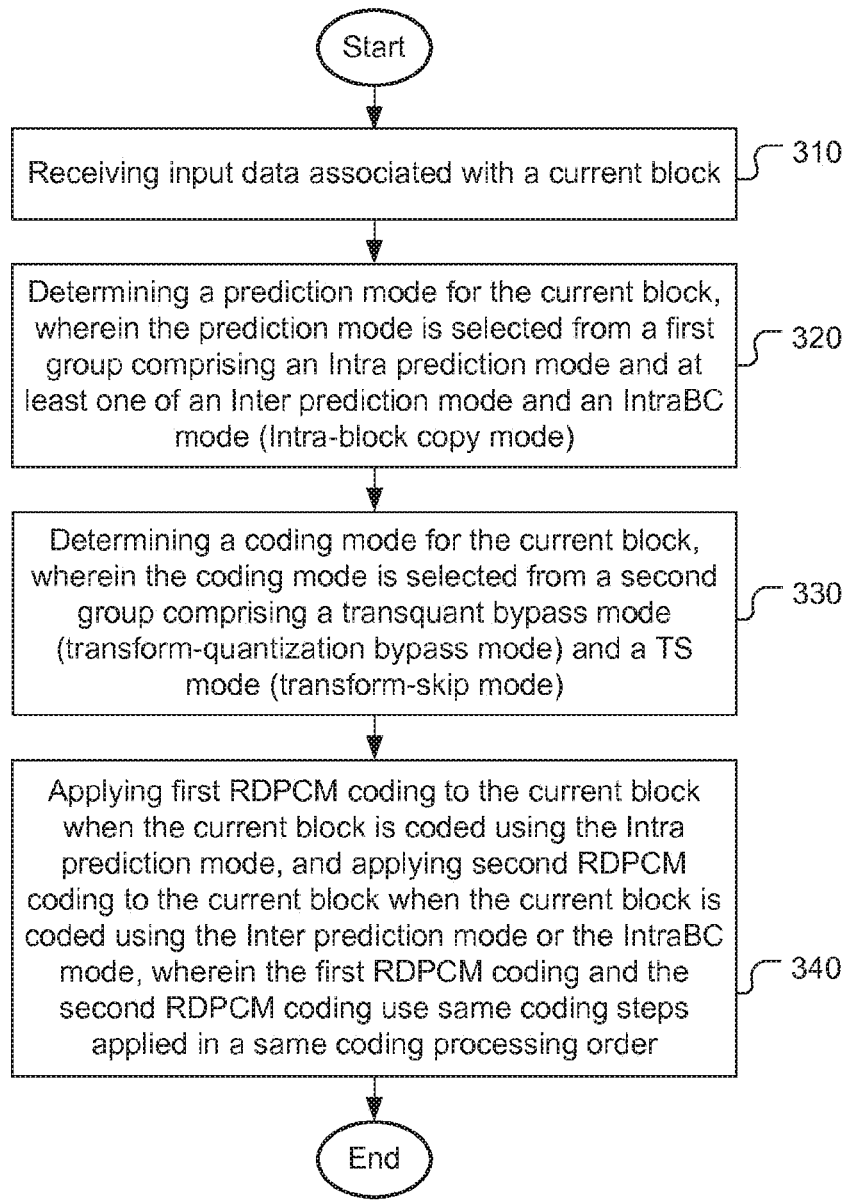
FIG. 3 illustrates a flowchart of an exemplary system incorporating an embodiment of the present invention to unify RDPCM coding among Intra prediction, Inter prediction and Intra-block copy modes.

FIG. 3 illustrates a flowchart of an exemplary system incorporating an embodiment of the present invention to unify RDPCM coding among Intra prediction, Inter prediction and Intra-block copy. The system receives input data associated with a current block as shown in step 310. For encoding, the input data corresponds to pixel data to be encoded. For decoding, the input data corresponds to coded pixel data to be decoded. The input data may be retrieved from memory (e.g., computer memory, buffer (RAM or DRAM) or other media) or from a processor. A prediction mode is determined for the current block as shown in step 320, where the prediction mode is selected from a first group comprising an Intra prediction mode and at least one of an Inter prediction mode and an IntraBC prediction mode (Intra-block copy mode). A coding mode for the current block is determined as shown in step 330, where the coding mode is selected from a second group comprising a transquant bypass mode (transform-quantization bypass mode) and a TS coding mode (transform-skip coding mode). In step 340, first RDPCM coding is applied to the current block when the current block is coded using the Intra prediction mode; and second RDPCM coding is applied to the current block when the current block is coded using the Inter prediction mode or the IntraBC prediction mode. The first RDPCM coding and the second RDPCM coding use the same coding steps applied in the same coding processing order.

Figure 4:
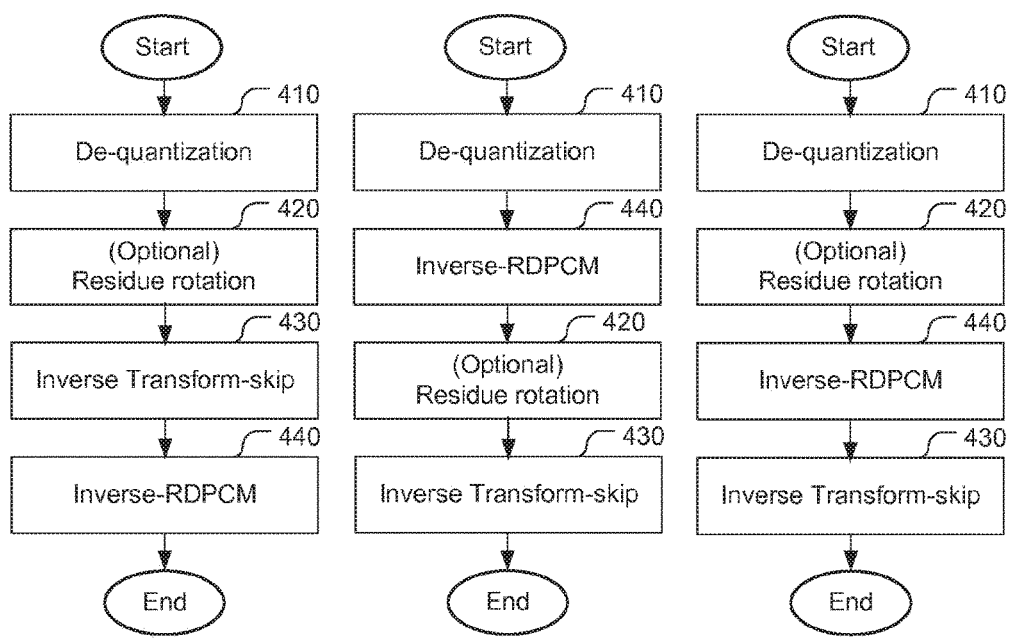
FIGS. 4A-4C illustrate unified RDPCM decoding corresponding to three embodiments of the present invention.

FIGS. 4A through 4C illustrate unified decoding process for the first embodiment through the third embodiment respectively. FIG. 4A corresponds to the unified decoding process for the first embodiment. As shown in FIG. 4A, the de-quantization processing (410) is applied first, followed by the optional residue rotation (420), inverse transform-skip (430) and inverse-RDPCM (440) in order. FIG. 4B corresponds to the unified decoding process for the second embodiment. As shown in FIG. 4B, the de-quantization processing (410) is applied first, followed by inverse-RDPCM (440), optional residue rotation (420) and inverse transform-skip (430) in order. FIG. 4C corresponds to the unified decoding process for the third embodiment. As shown in FIG. 4C, the de-quantization processing (410) is applied first, followed by the optional residue rotation (420), inverse-RDPCM (440) and inverse transform-skip (430) in order.

Figure 5:
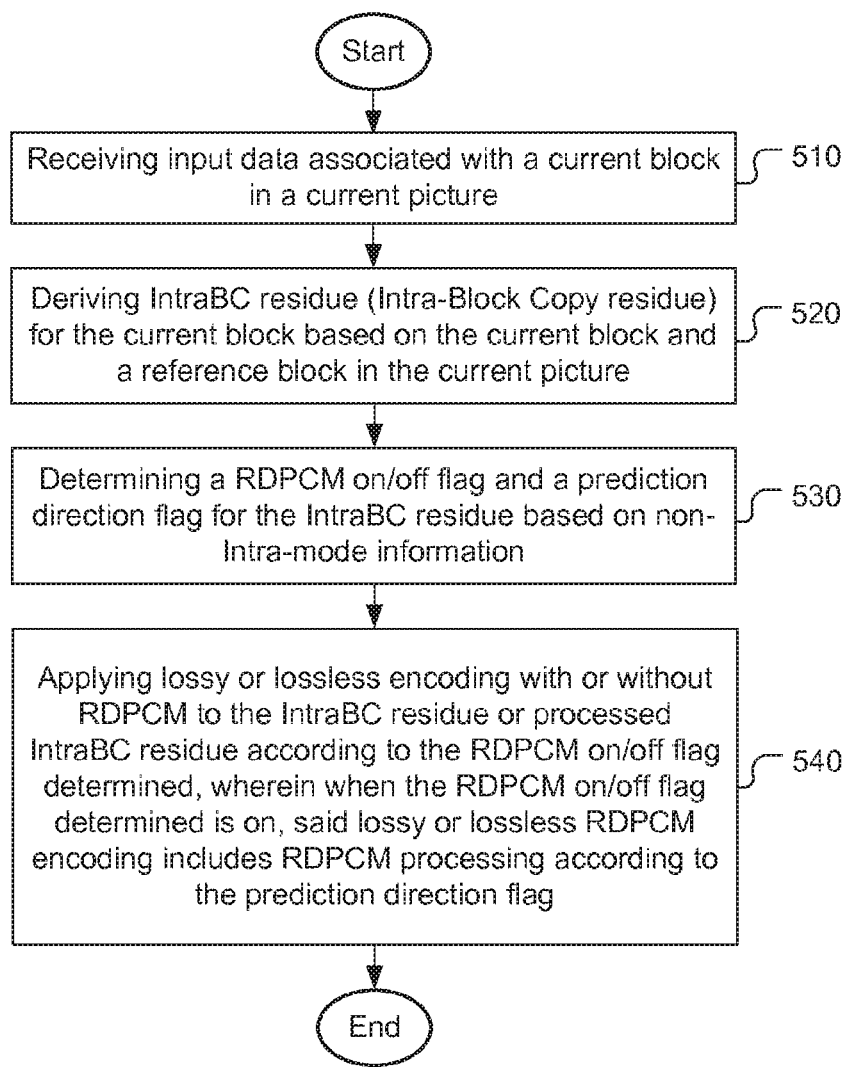
FIG. 5 illustrates a flowchart of an exemplary encoding system incorporating an embodiment of the present invention to extend Inter RDPCM coding to blocks coded using the Intra-block copy mode.

FIG. 5 illustrates a flowchart of an exemplary encoding system incorporating an embodiment of the present invention to extend Inter RDPCM coding to blocks coded using the Intra-block copy mode. Input data associated with a current block in a current picture is received in step 510. IntraBC residue (Intra-Block Copy residue) for the current block is derived based on the current block and a reference block in the current picture in step 520. A RDPCM on/off flag and a RDPCM prediction direction flag for the IntraBC residue are determined in step 530. According to the determined RDPCM on/off flag, lossy or lossless encoding with or without RDPCM is applied to the IntraBC residue or processed IntraBC residue in step 540. When the determined RDPCM on/off flag is on, the lossy or lossless RDPCM encoding includes RDPCM processing according to the RDPCM prediction direction flag.

Figure 6:
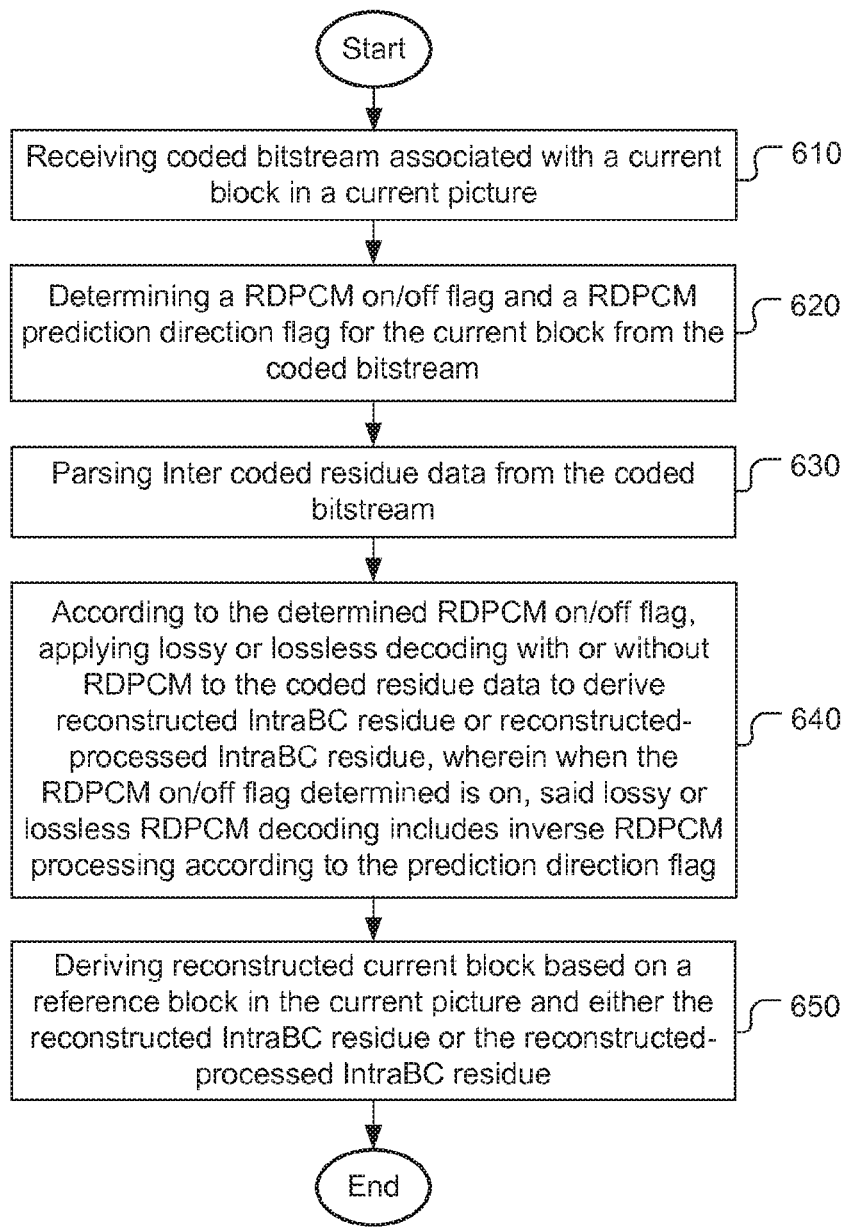
FIG. 6 illustrates a flowchart of an exemplary decoding system incorporating an embodiment of the present invention to extend Inter RDPCM coding to blocks coded using the Intra-block copy mode.

FIG. 6 illustrates a flowchart of an exemplary decoding system incorporating an embodiment of the present invention to extend Inter RDPCM coding to blocks coded using the Intra-block copy mode. Coded bitstream associated with a current block in a current picture is received in step 610. A RDPCM on/off flag and a RDPCM prediction direction flag for the current block is determined from the coded bitstream in step 620. Inter coded residue data is parsed from the coded bitstream in step 630. According to the determined RDPCM on/off flag, lossy or lossless decoding with or without RDPCM is applied to the coded residue data to derive reconstructed IntraBC residue or reconstructed-processed IntraBC residue in step 640. When the determined RDPCM on/off flag is on, the lossy or lossless RDPCM decoding includes inverse RDPCM processing according to the determined RDPCM prediction direction flag. Reconstructed current block is derived based on a reference block in the current picture and either the reconstructed IntraBC residue or the reconstructed-processed IntraBC residue in step 650.

The flowcharts shown above are intended to illustrate examples of unified Inter/Intra RDPCM, extending Inter RDPCM to blocks coded in the IntraBC prediction mode, according to the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of RDPCM (Residue Differential Pulse-Code Modulation) coding for a block of a picture, the method comprising:
   receiving input data associated with a current block;
   determining a prediction mode for the current block, wherein the prediction mode is selected from a first group comprising an Intra prediction mode and at least one of an Inter prediction mode and an IntraBC (Intra-block copy) prediction mode;
   determining a coding mode for the current block, wherein the coding mode is selected from a second group comprising a transquant bypass mode (transform-quantization bypass mode) and a TS mode (transform-skip mode); and
   applying first RDPCM encoding or decoding to the current block when the current block is coded using the Intra prediction mode, and applying second RDPCM encoding or decoding to the current block when the current block is coded using the Inter prediction mode or the IntraBC prediction mode, wherein:
      the first RDPCM encoding and the second RDPCM encoding (a) use same encoding steps applied in a same encoding processing order and (b) include transform-skip (TS) processing and optional residue rotation (RR) processing, wherein said same encoding processing order includes RDPCM processing occurring before TS processing and RR processing, and
      the first RDPCM decoding and the second RDPCM decoding (a) use same decoding steps applied in a same decoding processing order and (b) include inverse TS processing and optional RR processing, wherein said same decoding processing order includes inverse RDPCM processing occurring after inverse TS processing and optional RR processing.

2. The method of claim 1, wherein the same encoding steps comprise TS processing, RDPCM processing and quantization processing, and the same decoding steps comprise de-quantization processing, inverse RDPCM processing, inverse TS processing when the current block is coded using the TS mode.

3. The method of claim 2, wherein said same encoding processing order corresponds to the RDPCM processing followed by the TS processing and the optional RR processing in order, and said same decoding processing order corresponds to the optional RR processing followed by the inverse TS processing and the inverse RDPCM processing in order.

4. The method of claim 2, wherein said same encoding processing order corresponds to RDPCM processing followed by the optional RR processing and the TS processing in order, and said same decoding processing order corresponds to the inverse TS processing followed by the optional RR processing and the inverse RDPCM processing in order.

5. The method of claim 1, wherein the first group consists of the Intra prediction mode, the Inter prediction mode and the IntraBC prediction mode, and the same encoding steps or the same decoding steps are applied to the current block when the current block is coded using the Intra prediction mode, the Inter prediction mode and the IntraBC prediction mode.

6. The method of claim 1, wherein the same encoding steps comprise RDPCM processing and the same decoding steps comprise inverse RDPCM processing, wherein a prediction direction corresponding to a vertical direction or a horizontal direction is associated with the RDPCM processing and the inverse RDPCM processing, the prediction direction is determined implicitly for the current block coded in the Intra prediction mode, and the prediction direction is determined explicitly at an encoder side for the current block coded in the Inter prediction mode and the IntraBC prediction mode.

7. The method of claim 6, wherein the prediction direction is determined implicitly based on Intra mode of the current block when the current block is coded in the Intra prediction mode.

8. The method of claim 6, wherein the prediction direction is signaled in a coded bitstream for the current block coded in the Inter prediction mode and the IntraBC prediction mode.

* * * * *